United States Patent [19]

Woloshuk et al.

[11] 4,294,523

[45] Oct. 13, 1981

[54] THREE-DIMENSIONAL DISPLAY APPARATUS

[75] Inventors: Edward A. Woloshuk; Gregory J. Walz, both of New York; Robert O. Kretzschmar, Brooklyn, all of N.Y.

[73] Assignee: The Zyntrax Corporation, New York, N.Y.

[21] Appl. No.: 86,393

[22] Filed: Oct. 19, 1979

[51] Int. Cl.$^3$ .............................................. G03B 21/32
[52] U.S. Cl. ...................................... 352/86; 352/43; 352/92; 352/140
[58] Field of Search .................. 352/84, 86, 43, 5, 92, 352/140, 169

[56] References Cited

U.S. PATENT DOCUMENTS

| | | | |
|---|---|---|---|
| 3,376,093 | 4/1968 | Freudenschuss | 352/5 |
| 3,428,393 | 2/1969 | Montebello | 352/43 |
| 3,462,213 | 8/1969 | Montebello | 352/86 |
| 3,515,473 | 6/1970 | Theer et al. | 352/92 |
| 3,649,110 | 3/1972 | Takahama | 352/92 |
| 3,772,978 | 11/1973 | Mito | 352/140 |
| 3,781,098 | 12/1973 | Heiniger et al. | 352/140 |
| 4,141,629 | 2/1979 | Mattes | 352/5 |

Primary Examiner—Monroe H. Hayes
Attorney, Agent, or Firm—Cooper, Dunham, Clark, Griffin & Moran

[57] ABSTRACT

This invention utilizes a series of two-dimensional photographs of successive cross-sections of an object. The photographs are arranged on a film strip in the order in which the successive sections appear in the object. The film strip is transparent and is intermittently illuminated as the successive frames of the film strip move across an optical path. A projection screen in the optical path is moved with respect to the optical path so that as each successive photograph is illuminated, that photograph is projected onto the screen at a successive position and so that each photograph as projected on the screen appears more remote from an observer than the preceding one. Thus there is formed on the screen a series of images which appear to an observer having persistence of vision to be a composite three-dimensional imgage. The illuminating means may omit the illumination of certain photographs of the series, so that only selected photographs are reproduced on the screen. An optical mask may also be used to block certain portions of the projected photographs. A changeable film holder is provided for retaining the film strip and protecting it.

20 Claims, 23 Drawing Figures

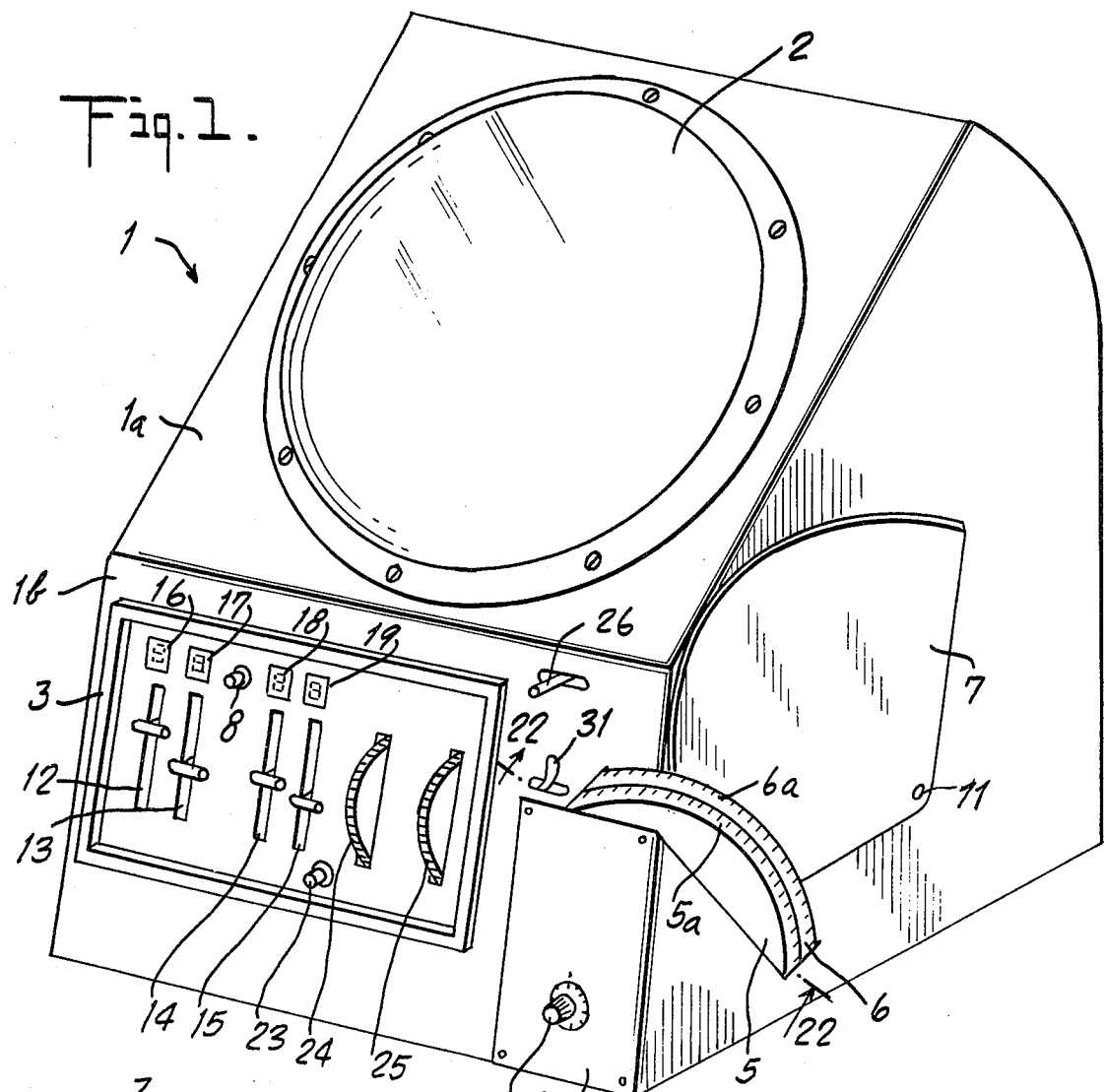
Fig.1.
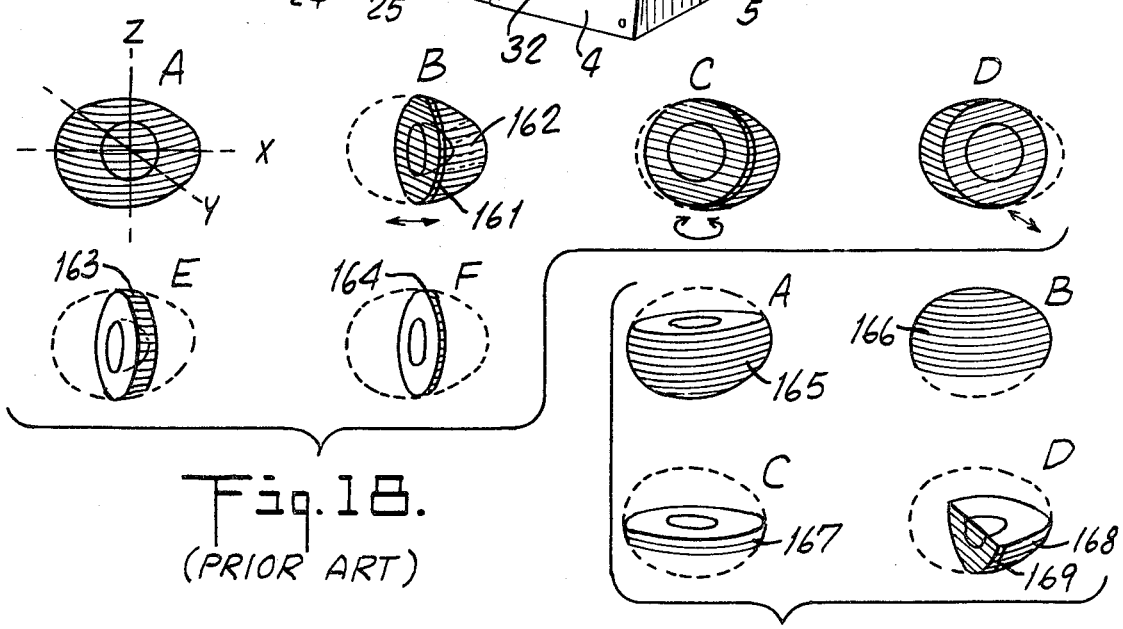
Fig.18. (PRIOR ART)
Fig.19.

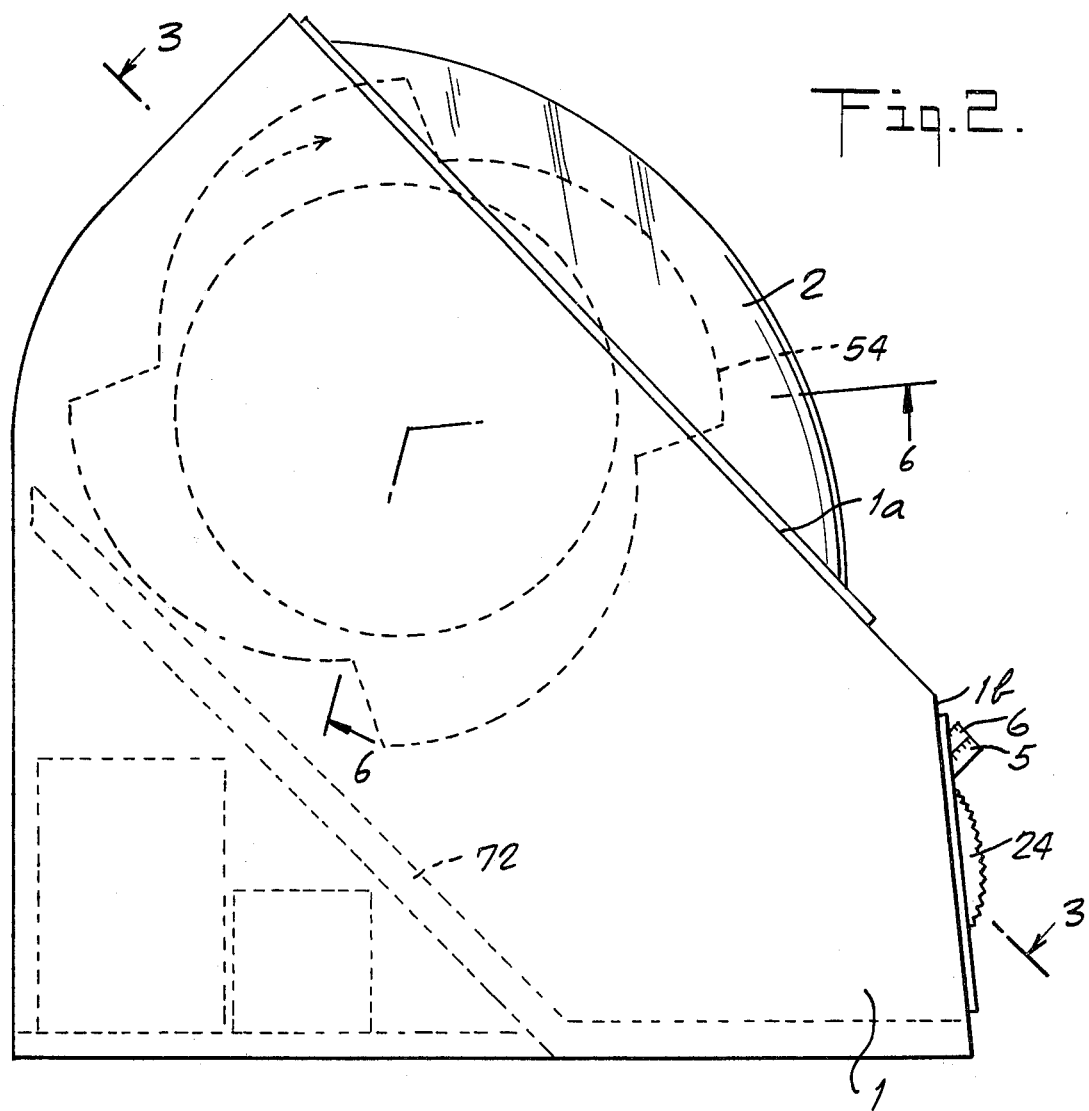
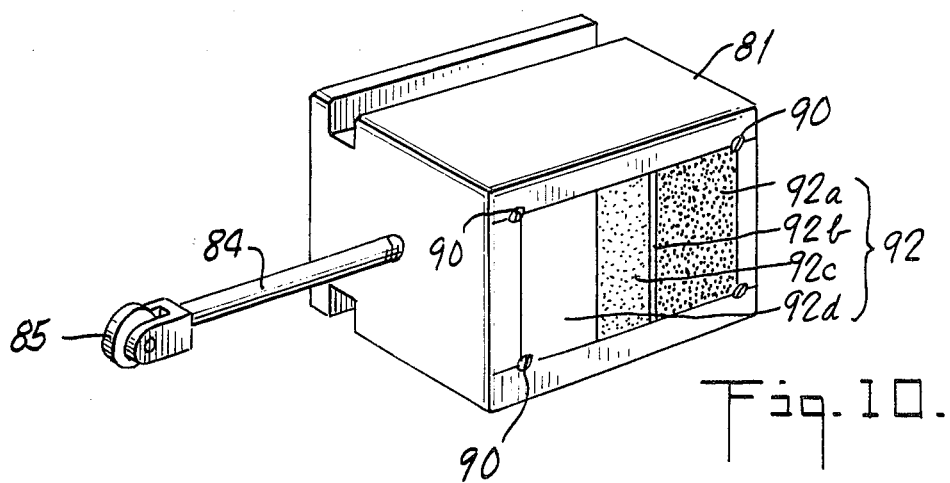

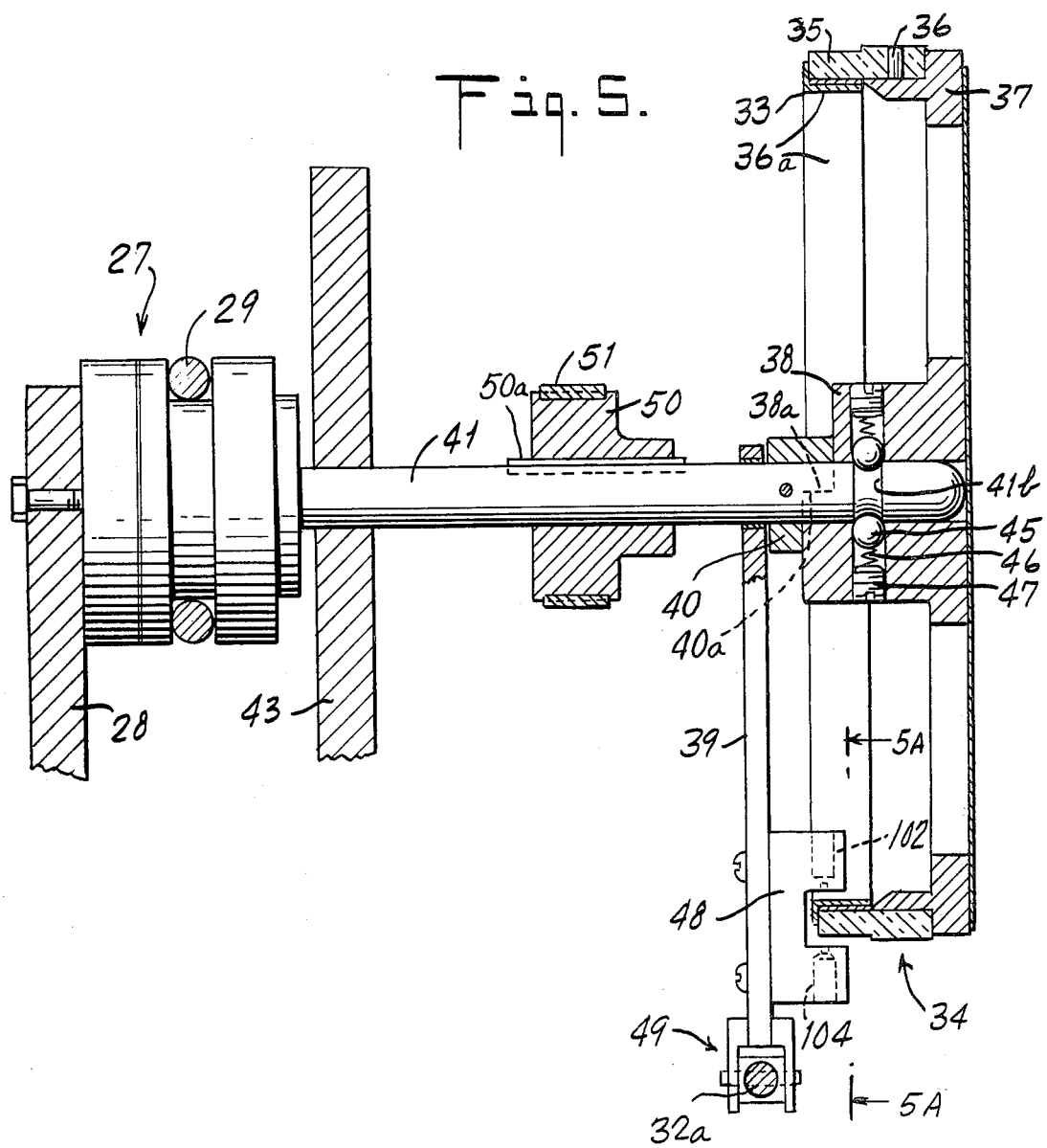
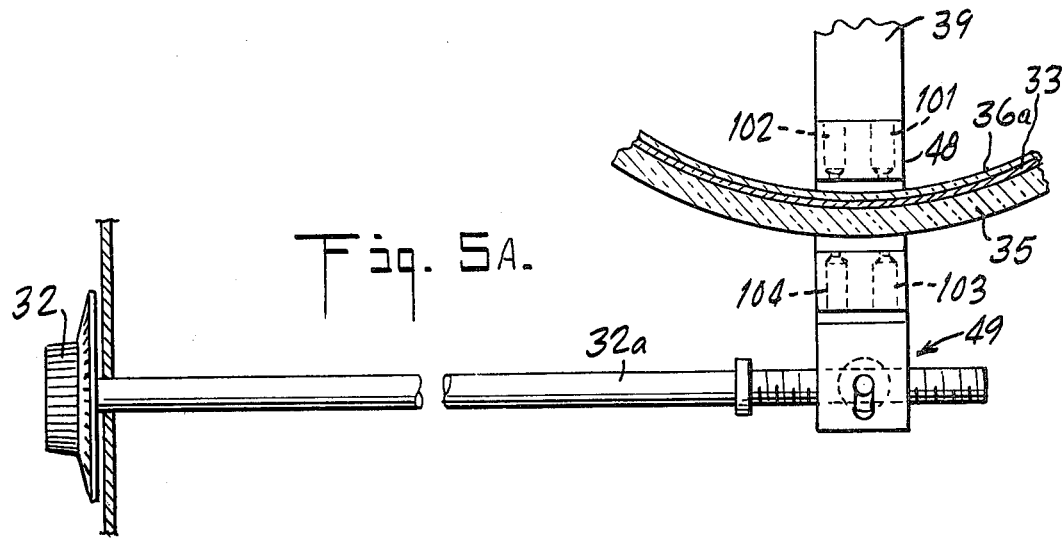

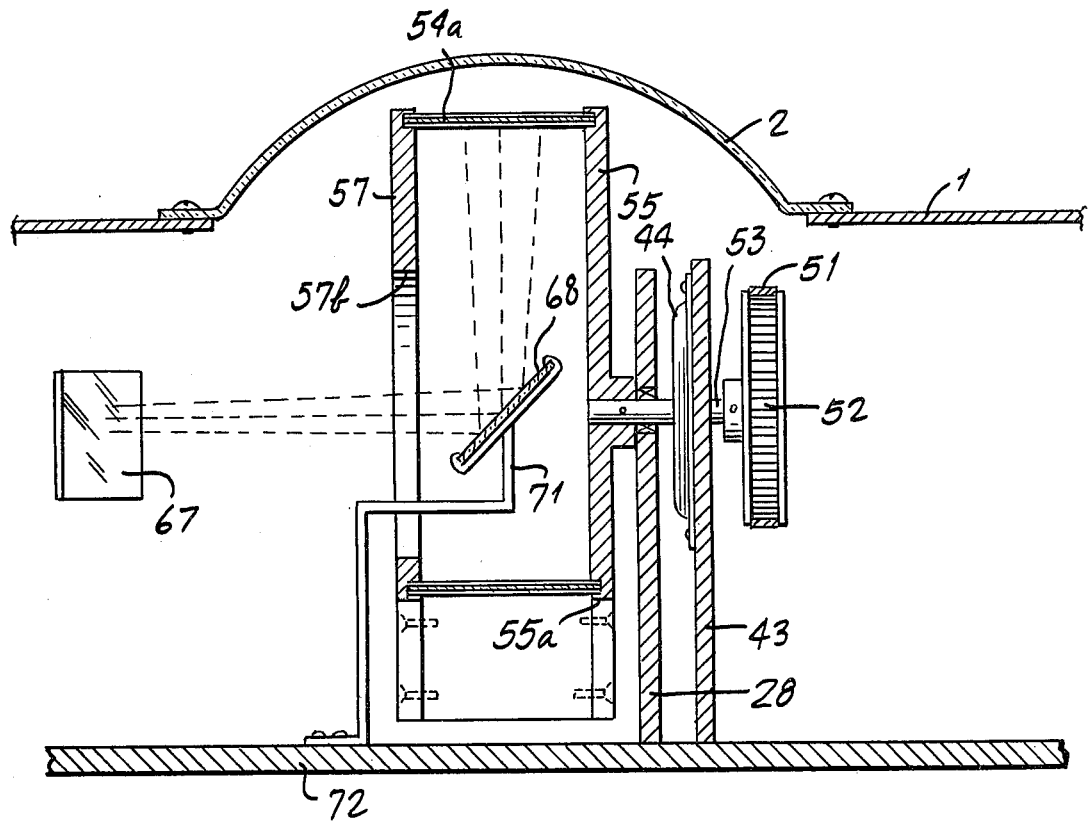
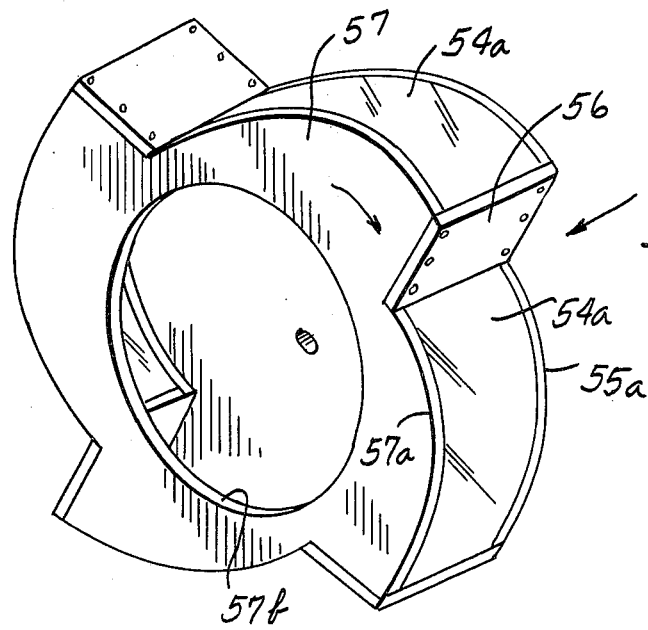

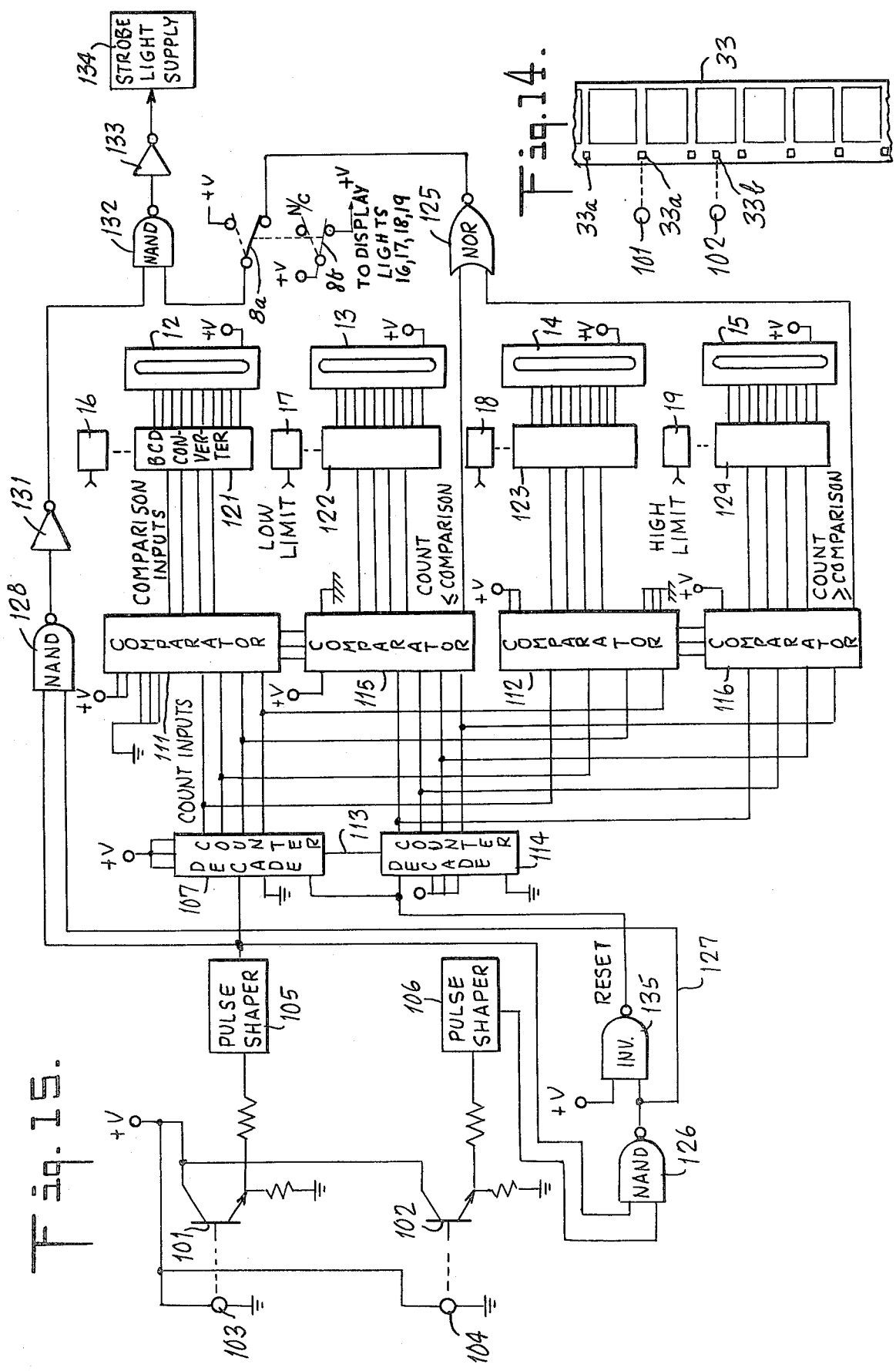

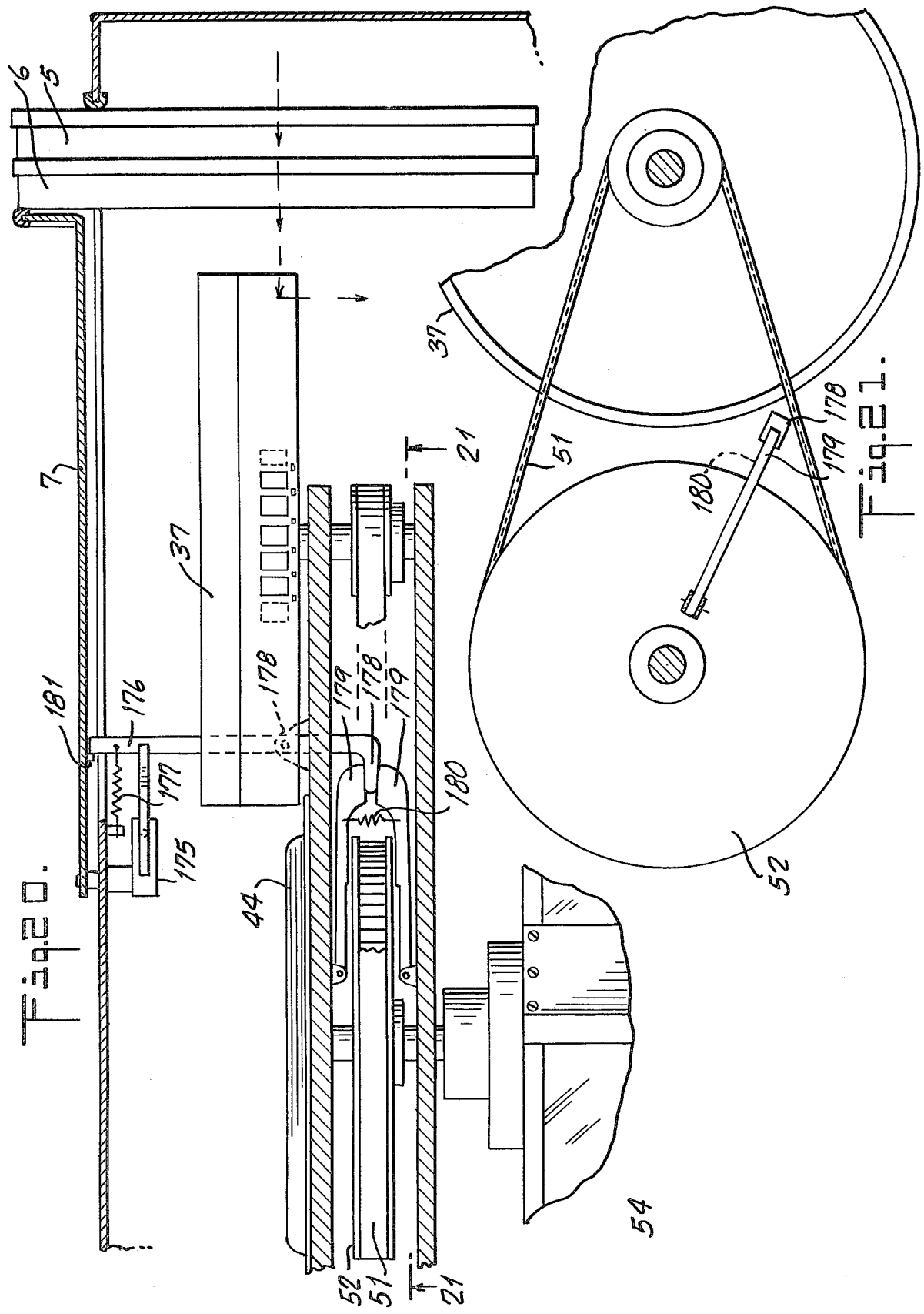

THREE-DIMENSIONAL DISPLAY APPARATUS

CROSS-REFERENCES

The apparatus disclosed herein is an improvement on the apparatus shown in the patents to de Montebello, U.S. Pat. Nos. 3,428,393 and 3,462,213, which are incorporated by reference.

BRIEF SUMMARY OF THE INVENTION

The apparatus of the de Montebello patents identified above utilizes a film strip comprising successive cross-sectional views of an object. The frames of the film strip are arranged in the order corresponding to the relationship of the successive cross-sections. The film strip is moved through an optical system in which the frames are successively illuminated one at a time, and the images produced by that illumination are projected on a rotating screen of spiral cross-section, rotatable about the axis of the spiral. In a modification, the screen is made up of segments of part-cylindrical contour, and is rotatable about an axis eccentric with respect to the axes of the several part-cylinders. The apparatus in de Montebello U.S. Pat. No. 3,428,393 masks out part of the images along a plane perpendicular to the planes of the successsive photographs in a series, so that an image can be produced which is cut away along a selected plane perpendicular to the planes of the original photographs.

The apparatus of the present invention is improved with respect to the apparatus of the de Montebello patents in that the present apparatus is capable of displaying an image which is cut away along any selected plane parallel to the planes of the original photographs, as well as views perpendicular to those planes. The apparatus of the present invention is also improved as to the brightness of the image produced. This increased brightness is obtained by rotating the projection screen in a direction so that the successive projected images appear successively farther from the viewer's eye. When the screen is moved away from the viewer's eye, each image retained by persistence of vision in the viewer's eye is not confused or dimmed by the presence of a successive image between the previous image and the viewer's eye.

The present invention is also improved with respect to the structure shown in the de Montebello patents by an improved and more compact drive system for moving the rotating parts; an improved replaceable holder for the film strip; a zoom lens inserted in the optical system for magnifying the image; and an improved mechanism for dissecting the image along planes perpendicular to the image.

DRAWINGS

FIG. 1 is a perspective view of an apparatus embodying the invention.

FIG. 2 is an elevational view of the apparatus of FIG. 1, taken from the left-hand side.

FIG. 5 is a fragmentary view taken on the line 5—5 of FIG. 3, on a larger scale.

FIG. 5A is a fragmentary sectional view taken on the line 5A—5A of FIG. 5.

FIG. 6 is a view taken on the line 6—6 of FIG. 2 with certain parts omitted.

FIG. 7 is a perspective view of the rotating screen.

FIG. 10 is a perspective view of a mask appearing in FIGS. 8 and 9.

FIG. 14 is a fragmentary view showing a portion of a film strip as used in the apparatus.

FIG. 15 is a wiring diagram of a circuit for controlling the stroboscopic lamp used to illuminate the film strip.

FIGS. 18A through 18F illustrate various forms of three-dimensional images which may be produced either by the apparatus of the de Montebello patents or by the present apparatus.

FIGS. 19A through 19D show various forms of dissected three-dimensional images which can be produced only by apparatus constructed in accordance with the present invention.

FIG. 20 is a fragmentary sectional view of a portion of FIG. 3, on an enlarged scale, showing an interlock mechanism connected with a film changing door.

FIG. 21 is a fragmentary sectional view taken on the line 21—21 of FIG. 20.

DETAILED DESCRIPTION

FIG. 1

Figure 3:
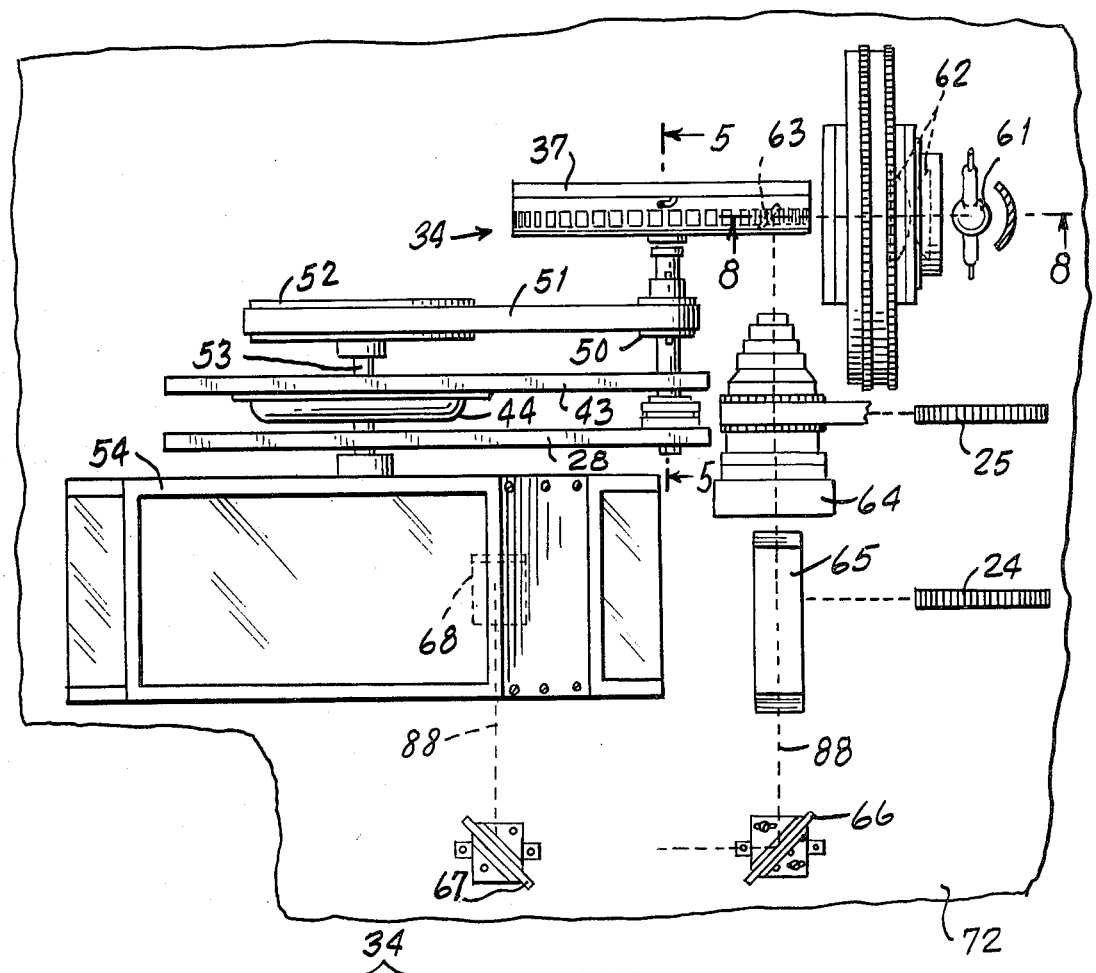
FIG. 3 is a cross-sectional view on the line 3—3 of FIG. 2, with certain parts omitted and others shown diagrammatically.

This figure illustrates the external appearance of the apparatus and includes a casing generally indicated at 1, having a forwardly facing slanted upper surface 1a on which there is centrally mounted a transparent dome 2 through which the three-dimensional display is to be observed. The front wall 1b of the casing below the slanting surface 1a includes a main control panel 3 and an auxiliary control panel 4. Projecting from the right-hand side of the surface 1b of casing 1 are a pair of cooperating rotatable discs 5 and 6 having respective scales 5a and 6a marked on their surfaces. A rotatable door 7, in its closed position, abuts against the rear side of the disc 6 and moves open on a pivot 11 to give access to the interior of the casing 1.

The main control panel 3 includes a frame selector activating switch 8 and four frame selector switches 12, 13, 14 and 15. Each switch includes an operating handle moving along a slot adjacent a fixed scale. Digital indicators 16, 17, 18, 19 are provided above each of the handles 12, 13, 14 and 15. These switch handles select from a film strip particular photographs to be displayed, by means of apparatus illustrated in FIG. 15.

A master switch 23 controls the supply of power to the entire apparatus. A knurled thumb wheel 24 controls a prism for rotating the image under the dome 2. Another knurled thumb wheel 25 controls a zoom lens which may be used to magnify the image appearing under the dome 2. A control 26 is used to move the film image transverse to the optical path by means of a clutch 27 acting on a shaft 41 which drives a film wheel 34 (see FIG. 5). A rotatable knob 32 controls the horizontal framing of the image by movement of photosensors 101 and 102 (see FIG. 5A). The controls, 26 and 32, may be used separately or in conjunction to select for magnification a particular portion of the projected image.

Figure 22:
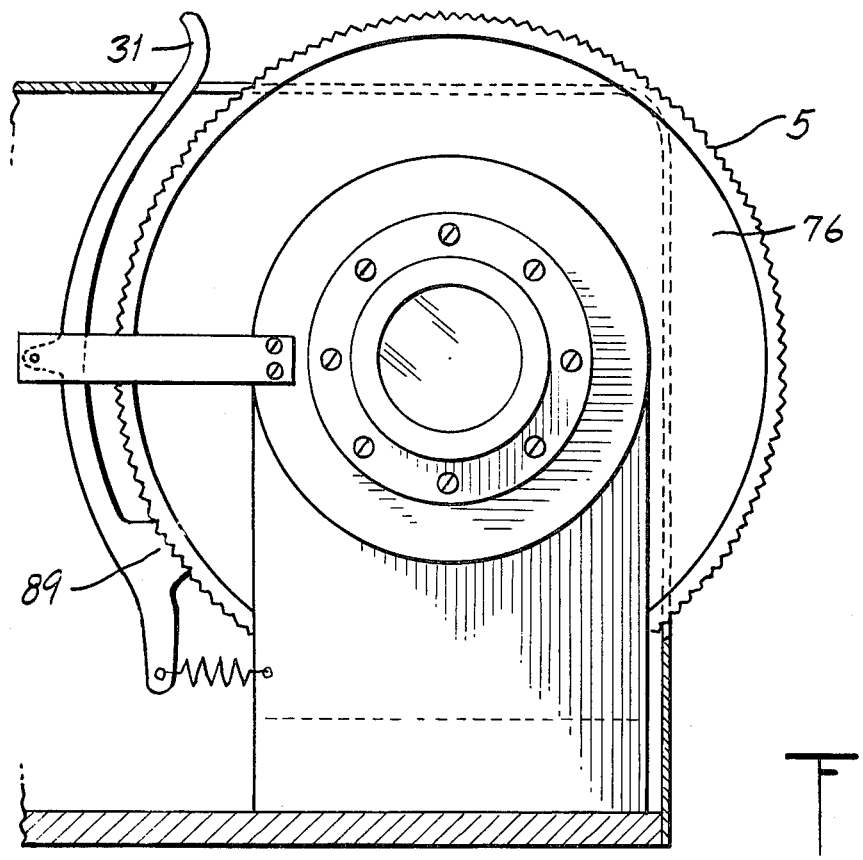
FIG. 22 is a fragmentary sectional view, showing a brake mechanism for a control disc.

The discs 5 and 6 normally rotate independently, the disc 5 being held stationary by a brake 89 (FIG. 22) controlled by a brake release control 31. When the release control 31 is operated, it is possible to rotate the discs 5 and 6 together as explained below.

FIGS. 2-10

Figure 4:
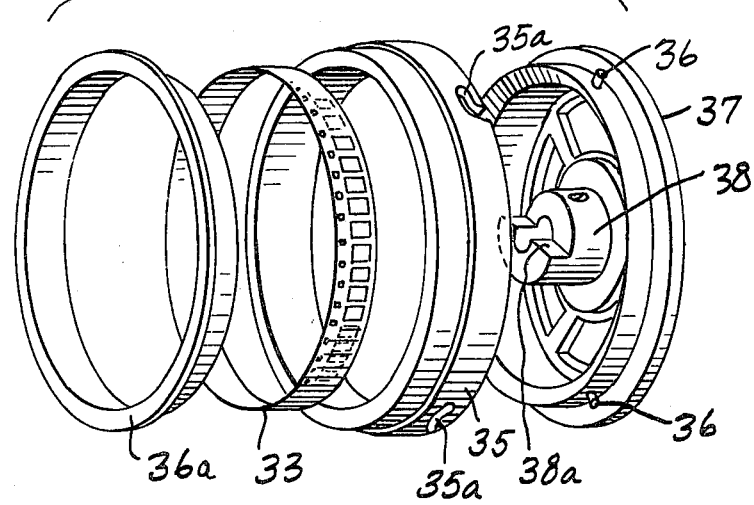
FIG. 4 is an exploded perspective view of a film holder appearing in FIG. 3, on a larger scale.

FIGS. 2 and 3 illustrate the principal parts of the apparatus and their relation to the casing as illustrated in FIG. 1. A film strip 33 (see FIGS. 3 and 4) is mounted in a film holder 34 comprising a transparent hollow drum 35 at the inner surface of that drum. A transparent locking ring 36a of substantially thinner material than the drum 35 may be moved into the drum after the film is in place and thereafter expanded and locked to hold the film in place. The drum 35 is provided with curved slots 35a cooperating with pins 36 on a wheel 37 fixed on a hub 38. The pins 36 and slots 35a form a bayonet joint. The drum 35 may alternatively be provided with apertures which can receive springloaded balls mounted on the wheel 37 in place of the pins 36.

The hub 38 is provided with a step 38a at one end to cooperate with a step 40a on a hub 40 fixed on a shaft 41 for rotation therewith. (See FIG. 5). The shaft is supported by a plate 28 and a plate 43. The plate 43 also serves as a mount and a heat sink for a motor 44 (See FIG. 3).

The hub 38 is apertured to receive a pair of balls 45, which are biased by springs 46 held in place by threaded retainers 47. The balls 45 cooperate with a groove 41b in the shaft 41, and releasably lock the hub 38 to the shaft 41, so that the hub 38 and the film holder 34 mounted thereon can be readily removed as a unit from the shaft 41.

A pulley 50 is mounted on the shaft 41. This pulley 50 is slidable on the shaft 41 through a limited excursion and fixed against rotation thereon by a key 50a. Over the pulley 50 runs a belt 51. The belt 51 runs over another pulley 52 fixed on a shaft 53 driven by the motor 44. The belt 51 and the pulleys 50 and 52 are provided with mating teeth, so that there can be no slippage between the film wheel 37 and the shaft 53.

Rotatably mounted on the shaft 41 is an arm 39, which projects downwardly and carries near its lower end a U-shaped block 48 which supports a pair of photocells 101 and 102, inside the film holder 34, and a pair of lamps 103 and 104 located outside the film holder for energizing those photocells. The lower end of arm 39 is connected by a joint 49 to a shaft 32a connected to the framer control knob 32 at the front of the casing 1. The shaft 32a has at its end a screw member which cooperates with the joint 49 so the arm 39 may be rotated through a very limited excursion about the shaft 41.

The shaft 53 has fixed thereon a projection screen 54, best seen in FIG. 7, and comprising four projecting screen segments 54a of arcuate cross-section, each extending through an angle of about 90° with respect to the axis of the screen 54. The screen 54 comprises two discs 55 and 57 which hold the four screen segments 54a in fixed relation to each other. The disc 55 is fixed on the shaft 53. Each disc 55 and 57 has four arcuate quadrants 55a and 57a which mate with and hold the arcuate screen segments 54a. Attached to the end of each arcuate quadrant 55a is a plate 56 which extends axially and is attached at its other end to the corresponding spiral quadrant 57a of disc 57. The disc 57 has a central aperture 57b.

Figure 11:
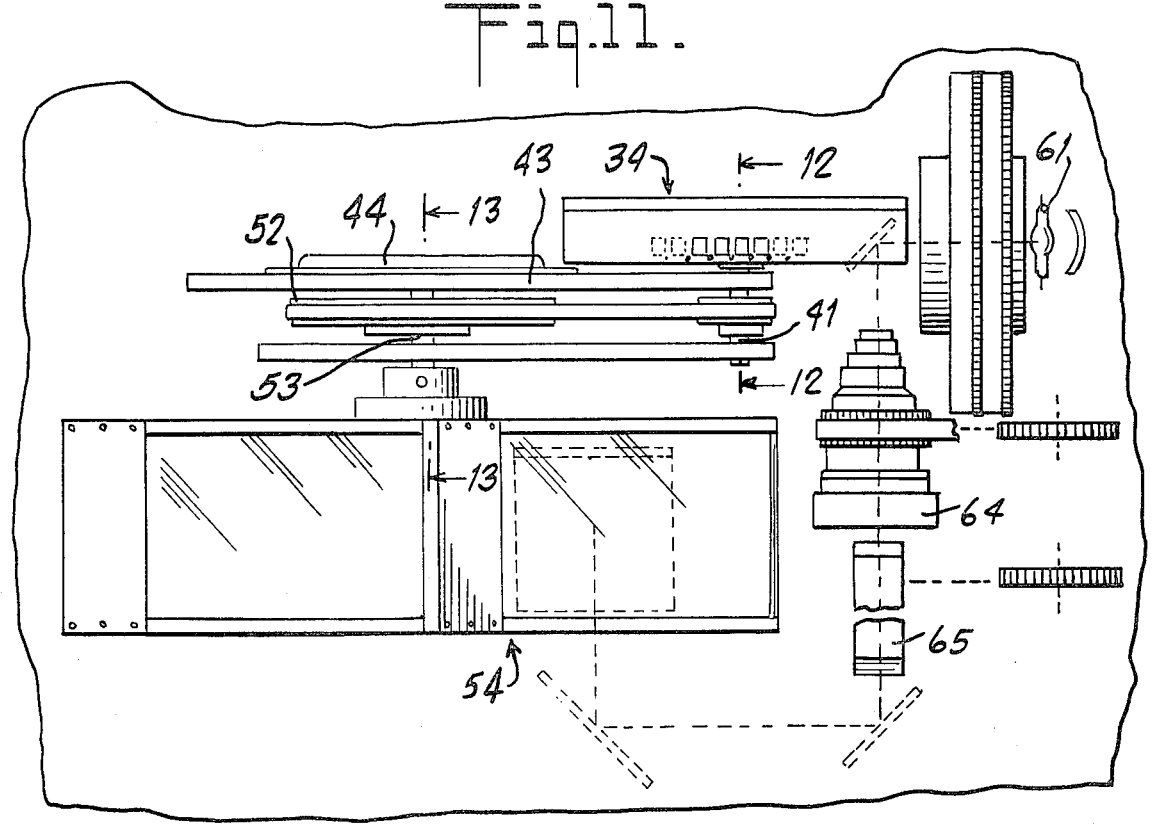
FIG. 11 is a view similar to FIG. 3, illustrating a modification, with certain parts omitted.

Light from a stroboscopic lamp 61 is projected along an optical path 88 best seen as a whole in FIG. 3. Beginning at lamp 61, the optical path may be traced through a pair of condensing lenses 62, and then passes through the transparent drum 35 and a frame of the film strip 33. The light is then reflected by a reflector 63 through a zoom lens 64 and a prism 65 to reflectors 66 and 67 to a final reflector 68 (see FIG. 6) located near the central axis of the screen 54. Reflector 68 is located slightly to the right of that axis, as viewed in FIGS. 3 and 11. The center line of the reflector 68 is in a horizontal plane through that axis, which plane is generally parallel to the outer portions of the rotating screen segments 54a as they pass under the dome 2. From the reflector 68, the image is projected directly onto a segment 54a of the screen 54. The reflector 68 is mounted on a bracket 71 (see FIG. 6) which is fastened to the base 72 and extends through the aperture 57b in the center of plate 57. The reflectors 63, 66, 67, 68 may be coated with a high reflecting coating (HR) which is deposited by sputtering or vapor deposition, and which reflects 95-98% of the light received on each surface.

The film wheel 37 (see FIG. 3) is rotated at a speed four times the speed of the screen drum 54, so that the entire film strip mounted on the wheel 37 is projected onto each screen segment 54a. The screen drum 54 rotates clockwise as viewed in FIGS. 2 and 7 so that the first frame projected on a screen 54a is viewed at the maximum radius of that screen. The subsequent frames of the film are projected on the screen at locations of successively decreasing radii. Thus, after each flash of the lamp 61 resulting in a projection of an image, the screen recedes slightly from the observer's eye before the next frame is projected on the screen. The three-dimensional effect is dependent on the persistence of vision in the observer's eye. By moving the screen away from the observer after each projected image, the screen does not appear to intervene between the persisting images and the new images. The resultant composite three-dimensional image is brighter than that obtained by the apparatus shown in the de Montebello patents, where the screen moves toward the observer's eye after each image is projected on it. The screen in that arrangement has an effect of competing with and detracting from the preceding persistent images. Also, because the wheel rotates clockwise as shown in FIGS. 2 and 7, the step 56 does not obstruct any part of the image from the viewer's eye at any point during the rotation of the screen 54. This also increases brightness achieved in the present embodiment over the embodiment described in the de Montebello patents, in which the step faced away from the viewer and thus partially obstructed the image as the screen rotated.

The dome 2 which provides a 360° view of the image projected may be tinted slightly with, for example, a gray tint and the screen segments 54a may be given a similar gray tint. With such an arrangement, the contrast between the projected images and the background is increased, so that the projected images are more readily visible to the observer. In the casing 1, should be mounted at least two cooling fans (not shown) to provide proper cooling for the lamp 61 and motor 44 described above.

FIGS. 8-10 AND 22

These figures illustrate an apparatus for operating a dissecting mask 92 to block out part of the three-dimensional image so that a vertical cross-sectional view appears. The mechanism is generally similar to that shown in de Montebello U.S. Pat. No. 3,428,393, but is improved in that the mechanism for operating the dissecting mask uses a simple eccentric cam mechanism, rather than the complex gear train illustrated in the de Montebello patent. Also, in the present embodiment, both discs 5 and 6, which control the mask 92, are visible and marked for registration one with the other. This allows retrieval of a previously viewed cross-section of the image. Such retrieval is impossible in the de Montebello embodiment.

A frame 73 is fixed on the base 72 and projects upwardly therefrom. (See FIG. 8). The frame 73 supports a nylon rim or bearing 74 in which a hub 75 is rotatable. The first control disc 5 is fixed to the rotatable hub by means of screws 77. The hub 75 carries a block 80 having a central transverse recess 80a in which a carrier 81 is slidable on a pair of guide rods 82. The carrier is biased to the left, as it appears in FIG. 9, by compression springs 83 encircling the guide rods. The opposite end of the carrier 81 is attached to a stem 84 on the end of which is fixed a roller follower 85 cooperating with an eccentric cam surface 86 formed on the second control disc 6.

The disc 6 has an internal inwardly projecting flange on which the cam surface 86 is formed. Three rollers 91 are mounted on stub shafts on the disc 5. The disc 6 has a concentric flange 87a which rides on the rollers 91, so that disc 6 is rotatable with respect to the rotatable disc 5.

As shown in FIG. 10, the carrier 81 supports the mask 92 having an opaque zone 92a, a relatively narrow clear zone 92b, a zone 92c of reduced light transmittance and a broad clear zone 92d. When the control disc 6 is rotated with respect to the control disc 5, the follower 85 rides along the cam 86 and drives the carrier 81 transversely of the optical axis 88 thereby selecting the portion of the mask 92 which is aligned with that axis. Thus, the mask 92 may be made to block out a vertical section of the three-dimensional image, to illuminate brightly any thin cross-sectional portion through the zone 92b and to illuminate dimly the remainder of the image through the reduced transmittance portion 92c (see FIG. 18B). Alternatively, the mask 92 may be moved so that the clear zone 92d is aligned with the optical axis and the complete image is transmitted to the optical system. See FIG. 18A. Other forms of mask may be used to produce other vertically dissected images as in FIGS. 18E and 18F. Also, the mechanism incorporates apparatus for identifying a particular cross-sectional view so that the particular view selected may be selected again on the same machine or may be selected on a similarly calibrated machine by reference to the markings on the discs 5 and 6 and the digital indicators 16, 17, 18 and 19. The use of the digital indicators 16, 17, 18, 19 and the handles 12, 13, 14, 15 is explained in detail below.

The frame 73 also carries a support 93 for the condensing lens 63.

A gate 94 is fixed on the frame 73 nearest the film holder 34.

When the two discs 6 and 5 are rotated together, they change the angle at which mask may be applied to the presented image. This is achieved by the rotation of the entire mask assembly 81 and its mounting hub 80. See FIG. 18B as compared to FIG. 18D, which shows the effect of rotation of the entire mask.

The two discs 5 and 6 are provided with knurled peripheries by which they may be readily rotated either together or separately. A brake 89 (FIG. 22) normally holds disc 5 against rotation. This brake may be released by operation of the lever 31, to permit rotation of both discs 5 and 6 to select a particular viewing angle of the presented image. The brake is then re-engaged to hold a particular viewing angle and the mask, 92, is then shifted as described above to view a particular thin cross-sectional portion of the image.

FIG. 10 shows the mask assembly or carrier, 81, in a perspective. In the face of carrier 81 are four screws 90 which may be removed for convenient removal and changing of the mask 92.

FIGS. 11-13

Figure 12:
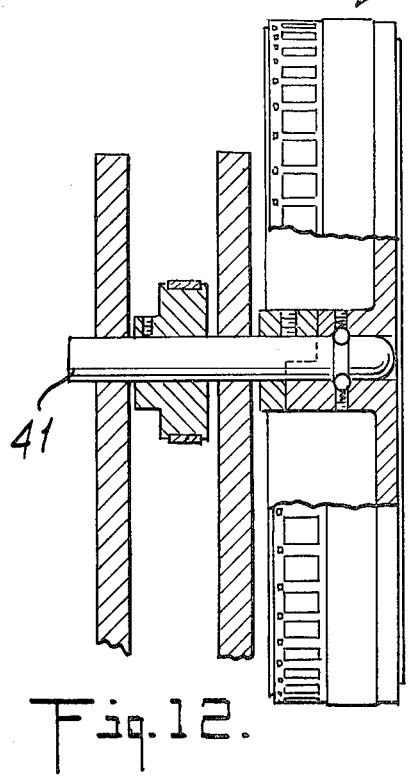
FIG. 12 is a view taken on the line 12—12 of FIG. 11.
Figure 13:
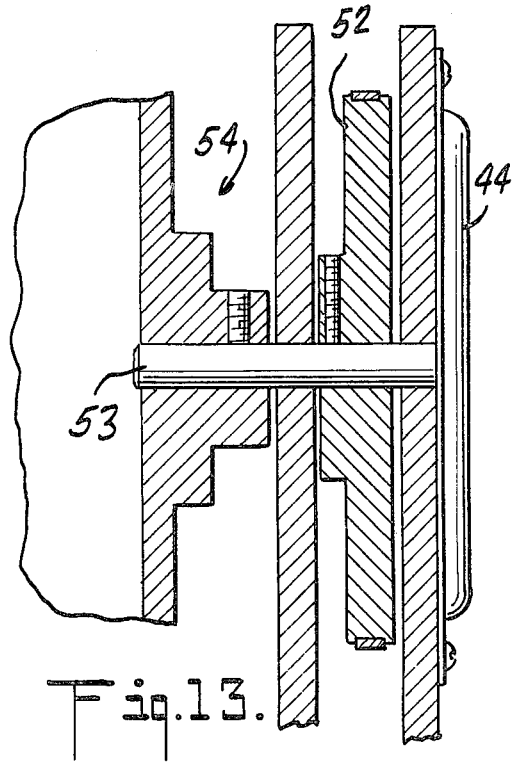
FIG. 13 is a sectional view taken on the line 13—13 of FIG. 11.
Figure 16:
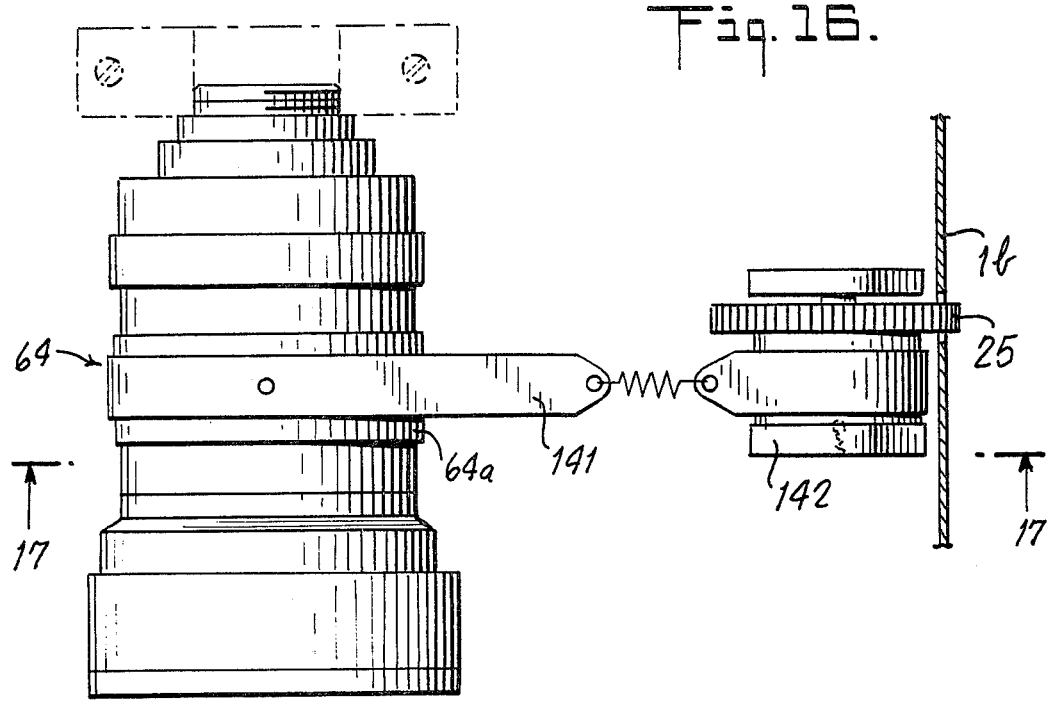
FIG. 16 is a plan view of the control for the zoom lens.
Figure 17:
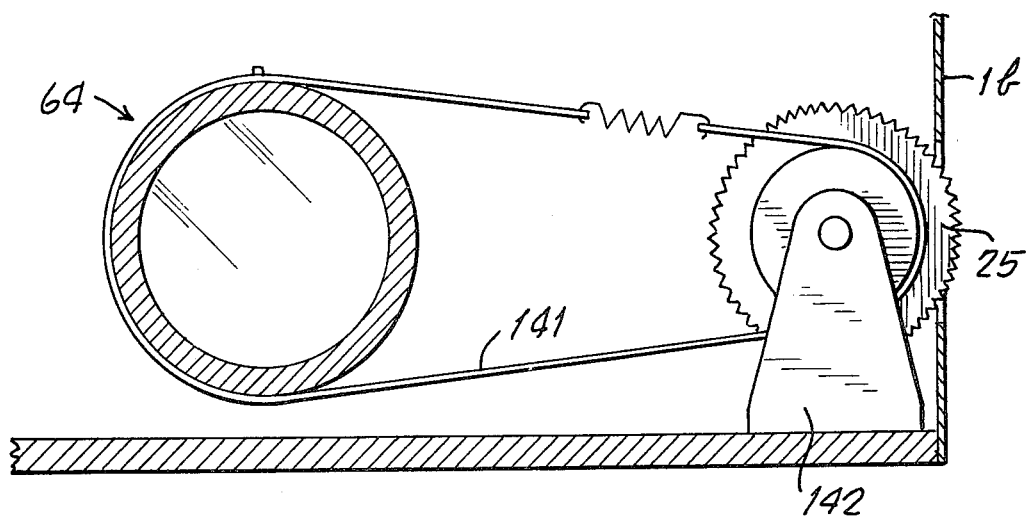
FIG. 17 is a sectional view on the line 17—17 of FIG. 16.

These figures illustrate a modified arrangement for driving the film holder 34 and the screen 54. In this arrangement, the motor 44 is located in the photosensor block 48 on the outboard end of the shaft 53, and the pulley 52 is located inboard of the heat sink plate 43. The advantage of this arrangement is that the shaft 41 and the film wheel 34 can be made somewhat shorter, thereby reducing the space requirements of the apparatus. The other parts shown in FIGS. 11-13 have been given the same reference numerals as their counterparts in FIGS. 2-10, and will not be further described. It should also be noted that certain features shown and described with respect to FIGS. 2-10 are not shown in FIGS. 11-13 for reasons of simplicity. It should be understood that these features would be included at the appropriate positions in an apparatus built in accordance with the arrangement shown in FIG. 11.

FIGS. 14-15

Figure 8:
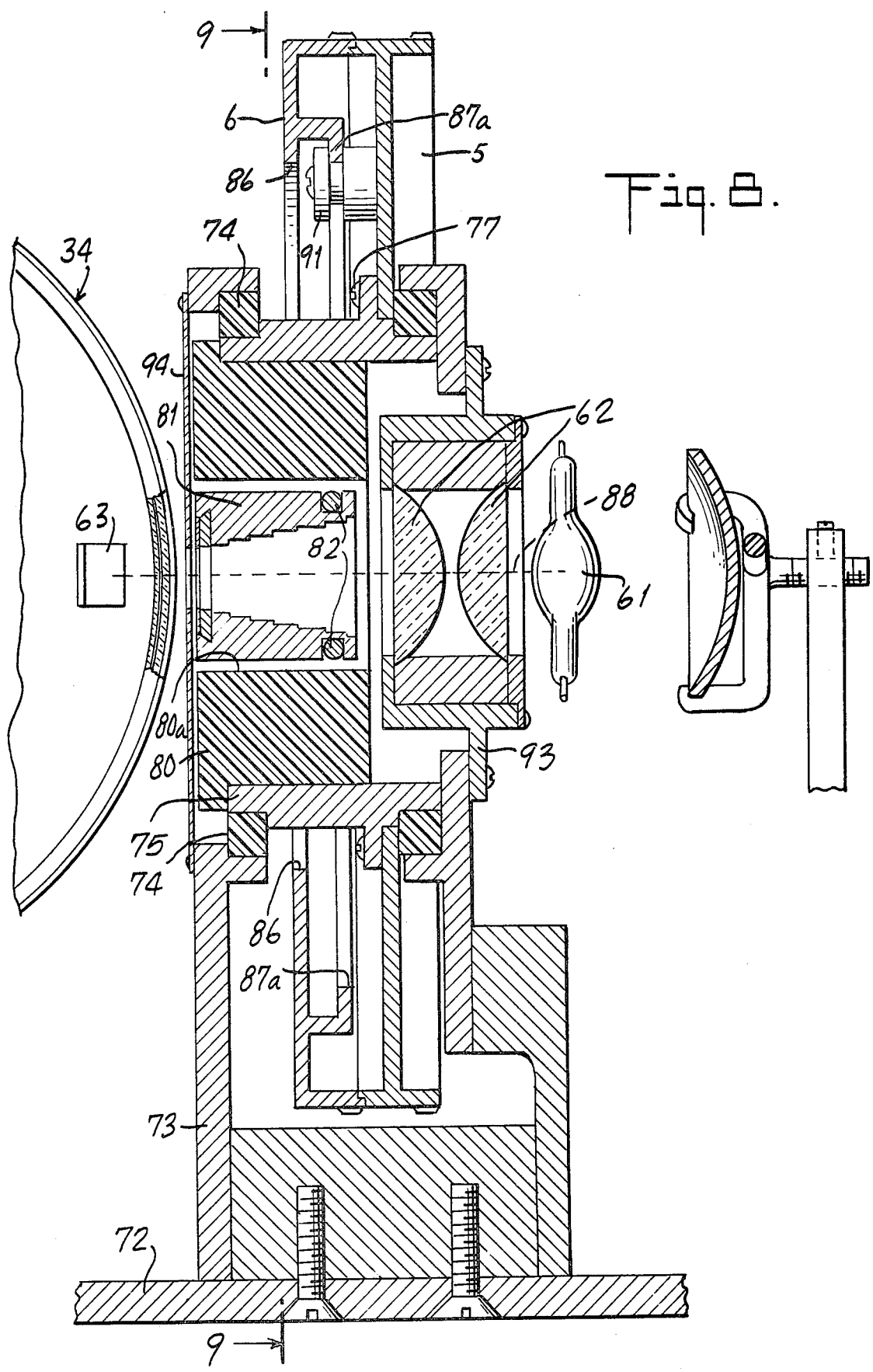
FIG. 8 is a fragmentary sectional view taken on the line 8—8 of FIG. 3, on a larger scale.
Figure 9:
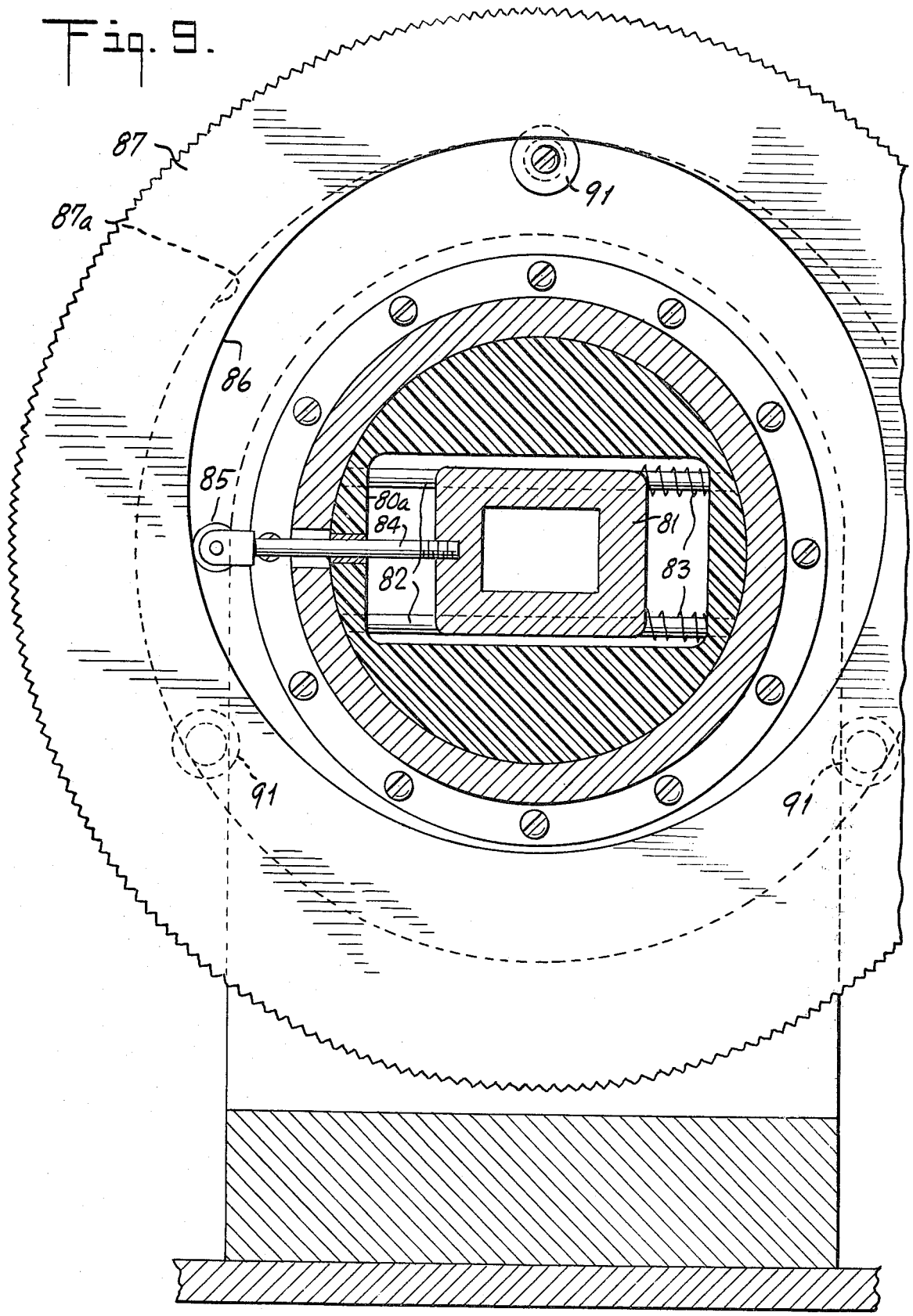
FIG. 9 is a cross-sectional view taken on the line 9—9 of FIG. 8.

FIG. 14 illustrates a fragment of the film strip 33 showing the usual sprocket holes 33a in one margin thereof. A reset aperture 33b is punched in the same margin halfway between two of the sprocket holes. This aperture 33b serves to reset the frame counters in a manner to be described below. The aperture 33b is located in the film strip 33 so that aperture 33b is in the center of the photosensor block 48 (FIG. 5) when the last frame of the film strip 33 passes gate 94 (FIG. 8). Aligned with the margin of the film strip carrying the sprocket holes 33a and the reset hole 33b are a pair of lamps 103 and 104 located in photosensor enclosure block 48 on the outside of the film holder 34 in its operating position (FIGS. 5 and 5A) and respectively cooperating with photosensors 101 and 102 located on the inside of the film holder. The photosensors 101 and 102 may be phototransistors whose base leads are left unconnected. They are set apart by a distance of 0.450 inch in enclosure 48.

The counter system of FIG. 15 (parallel section dissector) is energized by closing the switch 8 (composed of elements 8a and 8b) shown in the closed position in FIG. 15. This switch may be of the push-push type, and, when ON, serves to connect the output of NOR gate 125 to NAND gate 132, which gives trigger control to the counter/comparator circuitry through element 8a; and also, through element 8b, serves to supply power to the display indicators 16, 17, 18, 19.

It may be seen that the photosensor 101 responds to the light passing through the sprocket holes 33a and the reset hole 33b. The outputs of photosensors 101 and 102 are connected to pulse shapers 105 and 106, respectively, so as to produce square wave outputs for the rest of the circuitry. The output from photosensor 101 passes through NAND gate 128 inverter 131, NAND gate 132 and inverter 133 to supply the pulses that trigger the strobe supply 134. All of the other circuitry shown in FIG. 15 controls and gates these trigger pulses.

The output of photosensor 101 also passes to a decade counter 107 which records the count and converts it from binary to binary-coded-decimal (BCD) form. The BCD output of the counter 107 is transmitted to two comparators 111 and 112. The counter 107 is a units counter and has a tens output line 113 connected to a second decade counter 114 for tens having BCD output lines connected to two comparators 115 and 116. The comparison inputs of the comparators 111, 115, 112, 116 are generated by the four frame selector switches 12, 13, 14 and 15, respectively (see FIG. 1). The switches 12, 13, 14 and 15 control digital numerical displays 16, 17, 18 and 19, respectively, by means of BCD converters 121, 122, 123 and 124, respectively. The positions of each of the switches 12, 13, 14 and 15 are translated by BCD converters 121, 122, 123 and 124 respectively, to BCD form and are supplied to the comparison inputs of the comparators 111, 115, 112 and 116, respectively.

When the comparators 111 and 115 reach a count less than or equal to that of their comparison inputs, they transmit a high output signal to one input of NOR circuit 125. This drives the output of NOR 125 low, which locks the trigger output from photosensor 101, via NAND 132, and thus turns off the strobe supply 134. Likewise, when the comparators 112 and 116 reach a count greater than or equal to that of the comparison inputs, they transmit a signal to the second input of the NOR gate 125, which similarly locks the trigger output via NAND gate 132 and turns off strobe supply 134.

The photosensor 101 alone controls the counters 107 and 114, and provides the ultimate trigger pulse to strobe supply 134.

The photosensor 102, while it produces an output pulse in response to each passing sprocket hole, is arranged to reset the counters every time the reset aperture 33b passes it. Since the distance between the sprocket holes 33a is 0.300 inch, and the distance between photosensors 101 and 102 is 0.450 inch, when reset aperture 33b passes photosensors 101 and 102, both will receive light simultaneously. The output of photosensor 102 passes through pulse shaper 106 and is connected to one input of NAND gate 126. The other input of NAND gate 126 is from the output of pulse shaper 105 and hence from photosensor 101. The output of NAND gate 126 is connected to one input of an inverter circuit 135 whose output is connected to reset inputs of the decade counters 107 and 114. Those reset inputs are high when a pulse is received simultaneously by photosensors 101 and 102 (when reset aperture 33b passes) and reset the decade counters to a zero count.

The output of NAND gate 126 is also connected through a wire 127 to one input of NAND gate 128. The other input of NAND gate 128 comes directly from pulse shaper 105, and hence from photosensor 101. NAND gate 128 prevents the transmission of spurious trigger pulses to strobe supply 134 when reset hole 33b passes photosensors 101 and 102.

The output of NAND gate 128 passes through an inverter 131 to one input of NAND gate 132. The output of NOR gate 125 is also connected to another input of NAND gate 132 through element 8a of switch 8. When this input is *high* at +V potential (either from the +V line or the output of NOR gate 125), control of the trigger pulse is from photosensor 101, and the strobe supply 134 flashes strobe lamp 61 (FIGS. 3 and 8). When the output of NOR gate 125 goes low the NAND gate 132 output stays high, and the strobe trigger pulse from photosensor 101 is blocked and does not trigger the strobe lamp 61.

OPERATION OF FIG. 15

MODE 1—Parallel Section Dissector OFF

If the switch 8 is set so that element 8a is to +V and element 8b is to open (not connected or N/C), the NAND gate 132 operates as an inverter for signals from inverter 131. In this condition, display elements 16, 17, 18 and 19 are off. The photosensor 101 produces an output pulse in response to each sprocket hole 33a, of which there is one for every photographic frame in the film strip 33. These pulses are passed through NAND gate 128 and the NAND gate 132 and trigger the strobe lamp 61 as each frame passes the gate 94. The pulses are also transmitted to decade counter 107. However, in this mode the output of counters 107 and 114 is ignored. The NAND gate 128 is still operative in the circuit and prevents reset hole 33b from generating spurious pulses.

Mode 2—Parallel Section Dissector ON

If decade counters 107, 114 are reset to zero and switch contact 8a is set to NOR gate 125 output, switch contact 8b is set to the full line position shown, switches 12 and 13 are, for example, set to the number 11, and switches 14 and 15 are set to the number 48 then, the displays 16, 17, 18 and 19 are ON and read "1", "1", "4" and "8", respectively.

As before, photosensor 101 produces one pulse per passage of hole 33a, which goes to decade counter 107. However, until the decade counters reach the count of 11, the output of comparator 115 is *high* and the output from comparator 116 is *low*. The *high* output from comparator 115 is inverted by NOR gate 125 and this *low* signal is supplied to one input of NAND gate 132, which blocks the pulses to the strobe light supply 134 until the count of 11 is reached. At that count, the output from the comparator 115 goes *low,* and, since the output of comparator 116 is still *low*, the output of NOR gate 125 is *high.* Subsequent counting pulses from photosensor 101 provide the NAND gate 132 with the appropriate input pulses and hence triggers the strobe lamp 61 once for every passing frame. The photosensor 101 continues to pulse the strobe light for every passing frame until the comparators 112 and 116 reach the count (48) into the switches 14 and 15; at which time the output of comparator 116 goes *high*. The inverted (*low*) output of NOR gate 125 is transmitted, as before, to one input of NAND gate 132 and thereby blocks the output pulses from that gate from reaching the strobe supply, and thus stops the flashing of strobe lamp 61.

Thus, a selected number of frames at the beginning of the strip can be blanked out by setting the switches 12 and 13, and a selected number of frames at the end of the strip may be blanked out by setting the switches 14 and 15.

Common to Both Modes

The reset hole 33b is located in the film strip 33 so that it passes photosensor block 48 (FIG. 5), when the end of the film passes the gate 94 (FIG. 8). When the reset hole 33b is opposite photosensor 102 and sprocket hole 33a is simultaneously opposite photosensor 101, both of these photosensors transmit pulses simultaneously to NAND gate 126. NAND gate 126 then transmits an output pulse through the inverter 135 to the reset inputs of counters 107 and 114, resetting both counters to zero. An output pulse is also transmitted directly from NAND gate 126 to NAND gate 128.

The NAND circuit 128 functions to block the operation of the strobe light when the reset pulse is received from photosensor 102. The reason for this is that the strobe lamp has a maximum practical operating frequency and the flashing rate corresponding to the set speed of the motor 44 is near that maximum. The presence of an extra trigger pulse at a higher frequency, such as would be created by the reset aperture 33b, might impair the smooth, steady operation of the strobe light.

The film strip 33 commonly has about 90 frames, and the counters have a capacity of 99. It is therefore necessary to reset the counters after each passage of the film strip.

The position of the photosensors 101 and 102 may be adjusted with respect to the film wheel 34 so that the strobe light is energized at the correct instant during the passage of the frame. The mechanism for making this adjustment is illustrated in FIGS. 5 and 5A.

The film holder runs, in one embodiment of the invention, at 2000 rpm, and the projection screen wheel hence runs at 500 rpm.

FIGS. 16–17 AND FIGS. 5 AND 5A

These figures illustrate the controls for the zoom lens 64. The zoom lens 64 may be a conventional zoom lens, in which the magnifying power is changed by rotating a part of the lens structure, without changing the distance between the ends of the lens assembly. The magnification of the zoom lens 64 is controlled by a belt 141 which extends over a rotatable part 64a of the zoom lens and also over a pulley 142 driven by the knurled control wheel 25. If the portion of the image which is desired to be enlarged is not at the center of the presented image, the portion that is desired to be viewed may be shifted to the visual center of the projected image by either one or both of two separate mechanisms. First, the framing shaft 32a (FIG. 5A), may be rotated to shift a portion desired vertically in the field of view. Secondly, a simple clutch 27, may shift the shaft 41 a very small distance (approximately one half frame) along its axis in either direction. This is accomplished by movement of a clutch lever 26 (see FIG. 1). The end or fork of the lever 29, moves the clutch in either direction. In FIG. 5, the clutch is shown in its extreme left position. Thus, the clutch permits the portion of the image to be viewed to be positioned horizontally in the field of view. By the use of either or both these mechanisms, the portion to be enlarged is centered and the zoom lens is controlled to increase the magnification of the image.

It is understood that the pulley 50 is positioned on a key 50a on the shaft 41 so that the pulley will not move laterally if the clutch 27 is used by the operator or viewer.

FIGS. 18–19

FIG. 18A shows an egg as produced in a three-dimensional image by the apparatus of FIG. 1 from a series of horizontal cross-sectional photographs of the egg.

FIG. 18B shows the egg as dissected on a central vertical plane by the use of the mask 92. The opaque section 92a (FIG. 10) blocks out the left-hand part of the egg. The clear slit 92b shows the central section of the egg as shown at 161. The partially transparent section 92c of the screen allows the right-hand portion of the egg to appear dimly, as shown at 162.

FIG. 18C shows the image of FIG. 18B rotated about a vertical central axis which may be done by rotation of the prism 65 (FIG. 3) by the thumb wheel 24. The thumb wheel 24 operates to turn the prism 65 in the same way as the thumb wheel 25 operates to turn the center portion of the zoom lens 64.

FIG. 18D shows the egg of FIG. 18A dissected in a different view, with the right-hand end of the egg blocked from view and the left-hand section visible. This is accomplished by the rotation of the mask carrier 81.

FIG. 18E shows the egg dissected in a different fashion, by a screen different from that illustrated so that both ends of the egg are blocked off and only a central section 163 appears. In FIG. 18F, the central section has been reduced to a smaller lateral dimension, as shown at 164.

FIG. 19 shows an egg in which the top portion of the three-dimensional image has been blocked out, leaving only the bottom part of the egg, as shown at 165. FIG. 19B shows another three-dimensional image of an egg, where the bottom portion has been blocked out, leaving only the top portion 166.

FIG. 19C shows an image of an egg in which top and bottom portions have been blocked out leaving only a central section 167.

FIG. 19D shows an image of an egg in which the top half of the image has been blocked out by the technique of FIG. 19A and the selected left half of the image has been blocked out by the technique shown in FIG. 18B, so that in this case, only the right-hand lower quadrant of the egg is visible, as shown at 168, with a bright cross-section at the left end of that quadrant, as illustrated at 169. It can be seen from the foregoing that by the combined use of the prism 65, rotating mask assembly 81 and the blocking cicuitry shown in FIG. 15 any portion or angle of the image may be viewed and masked. The FIGS. 18 and 19 are merely illustrative of the techniques which can be employed to view any portion of the image.

FIGS. 20–21

The door 7 may be pivoted about the pivot 11 to provide access to the inside of the casing to permit removal of the film wheel 37 for the purpose of changing film strips. It is desirable to ensure that all rotating parts are stopped when the door 7 is open. For that purpose, the door 7 is provided with an interlock mechanism which actuates a microswitch 175 in the circuit of motor 44 to deenergize the motor as soon as the door is open. The opening of the door also releases a brake lever 176 biased to the left in FIG. 20 by a spring 177. The lever 176 is pivoted at 178. The other end of the lever 176 carries a wedge 178 located between two brake members 179. The brake members 179 are biased toward one another by a spring 180. When the door 7 is opened, the upper end of the lever 176 is released because the cam 181 is moved away from lever 176 as the door 7 is rotated open. Thus, the wedge 178 is removed from between the brake members 179. The brake members 179 then move against the rotating pulley 52, so as to bring all rotating parts of the apparatus to a stop quickly as soon as the door 7 is opened. When the door is closed again, the cam 181 engages the lever 176 and forces it back to the position shown, thereby operating the wedge 178 to release the brake memembers 179 from the pulley 52.

We claim:

1. Apparatus for forming and displaying a three-dimensional image of a selectable portion of a three-dimensional object, comprising:
   a. a series of two-dimensional photographs of successive sections of said object, said photographs being arranged in a predetermined order corresponding to the relationship that said successive sections bear to each other;
   b. illuminating means;
   c. an optical system defining an optical path extending from said illuminating means;
   d. means supporting said series of photographs and operable to move said series of photographs repeatedly through said optical path in said predetermined order and at a rate such that the series moves through the path within the period of persistence of vision, whereby said photographs are successively positioned for projection along said path;
   e. stroboscopic means for flashing said illuminating means as a photograph is aligned with said path;
   f. a projection screen disposed in said optical path and adapted to move along the optical path toward and away from the photographs moving through the optical path, said projection screen having its surface formed with a curved cross-section and being rotatable about an axis displaced from the center of curvature of the cross-section, which axis is disposed substantially at right angles to the optical path, said rotation being in synchronization with the motion of said photographs so that said photographs are projected onto the screen at successive positions thereof, and form a series of images which appear to an observer having persistence of vision to be a composite three-dimensional image; wherein the improvement comprises:
   g. means, including selection means manually settable at any time, for controlling said illuminating means to illuminate only selected photographs of said series during each movement of the series through said optical path.

2. Apparatus as in claim 1, including means for selectively preventing illumination of the photographs at one end of said series so as to cut away the three-dimensional image at one of said successive sections.

3. Apparatus as in claim 1, including means for selectively preventing illumination of the photographs at each end of said series so as to cut away the three-dimensional image at two of said sections, thereby displaying a selected middle portion of said object.

4. Apparatus as in claim 1 in which said controlling means includes:
   a. means for counting the photographs as they move through the optical path; and
   b. means for comparing the count set by said selection means with the count indicated by the counting means and for actuating the stroboscopic means in response to that comparison.

5. Apparatus as in claim 4, in which said photographs appear in a film strip having sprocket holes along at least one margin thereof, and said counting means includes means for counting the sprocket holes.

6. Apparatus as in claim 1, in which:
   a. said series of photographs is arranged in a film strip; and
   b. said means to move the photographs comprises a changeable film holder for retaining a film strip, said holder including a transparent drum for receiving a film strip on an inner surface thereof.

7. Apparatus as in claim 6, including:
   a. means for rotating the film holder including a shaft, a wheel removably mounted on the shaft, and a bayonet joint between the rim of the wheel and the drum for removably supporting the drum on the wheel.

8. Apparatus as in claim 6, including:
   a. means for rotating the film holder including a shaft, a wheel removably mounted on the shaft, and a spring tension ball in the rim of the wheel for holding the drum in fixed relation to the wheel when said drum is mounted on said wheel.

9. Apparatus as in claim 6, including:
   a. a continuously illuminated lamp on one side of the drum periphery;
   b. photosensitive means on the other side of the drum periphery;
   c. said film strip having holes coordinated with the the series of photographs thereon and passing between the lamp and the photosensitive means, by which the passage of each photograph may be detected;
   d. means for supporting the lamp and the photosensitive means adjacent the periphery of the drum; and
   e. means controlled by said photosensitive means for controlling said stroboscopic means.

10. Apparatus as in claim 9, including means for adjusting said support means angularly with respect to the axis of the drum so as to adjust the photosensitive means with respect to the frames in the film strip.

11. Apparatus as in claim 6, in which:
   a. said drum is of relatively thick transparent material;
   b. the illuminating means is located outside the drum;
   c. said locking ring is of relatively thin transparent material; and
   d. said optical system includes a reflector located inside the drum.

12. Apparatus for forming and displaying a three-dimensional image of a three-dimensional object, comprising:
   a. a series of two-dimensional photographs of successive sections of said object, said photographs being arranged in a predetermined order corresponding to the relationship that said successive sections bear to each other;
   b. illuminating means;
   c. an optical system defining an optical path extending from said illuminating means;
   d. means to move said photographs through said optical path in said predetermined order and at a rate such that the series moves through the path within the period of persistence of vision;

e. a projection screen disposed in said optical path and adapted to move along the optical path nearer to and farther from the photographs moving through the path, said projection screen having its surface formed with a curved cross-section and being rotatable about an axis displaced from the center of curvature of the cross-section, which axis is disposed substantially at right angles to the optical path;

f. stroboscopic means for flashing said illuminating means when a photograph is aligned with said path, whereby said photographs are projected onto said screen to create said three-dimensional image of said object;

g. an optical mask intersecting said optical path and having zones of different light transmittance;

h. support means for said mask;

i. means to rotate the mask about the axis of the optical path; and j. means to move the mask transversely of said optical path so that said zones of different light transmittance are selectively disposed in said optical path;

wherein the improvement comprises:

k. a first marking means cooperating with said mask rotating means; and l. a second marking means cooperating with said transverse moving means.

13. Apparatus for forming and displaying a three-dimensional image of a three-dimensional object, comprising:

a. a series of two-dimensional photographs of successive sections to said object, said photographs being arranged in a predetermined order corresponding to the relationship that said successive sections bear to each other;

b. illuminating means;

c. an optical system defining an optical path extending from said illuminating means;

d. means to move said photographs through said optical path in said predetermined order and at a rate such that the series moves through the path within the period of persistence of vision;

e. a projection screen disposed in said optical path and adapted to move along the optical path toward and away from the photographs moving through the path, said projection screen having its surface formed with a curved cross-section and rotatable about an axis displaced from the center of curvature of the cross-section, which axis is disposed substantially at right angles to the optical path;

f. stroboscopic means for flashing said illuminating means when a photograph is aligned with said path, whereby said photographs are projected onto said screen to create said three-dimensional image on said object;

wherein the improvement comprises:

g. means for driving the projection screen including a rotatable shaft supporting said screen;

h. a motor drivingly connected to said shaft;

i. a metallic support plate in which the shaft is journaled, said support plate being of substantial thickness and supporting the motor and serving as a heat sink therefor;

j. means connecting said shaft to said photograph moving means, comprising:

1. a second shaft supporting the photograph moving means and journaled in said support plate; and 2. means connecting said shafts for concurrent rotation.

14. Apparatus for forming and displaying a three-dimensional image of a three-dimensional object, comprising:

a. a series of two-dimensional photographs of successive sections of said object, said photographs being arranged in a predetermined order corresponding to the relationship that said successive sections bear to each other;

b. illuminating means;

c. an optical system defining an optical path extending from said illuminating means;

d. means to move said photographs through said optical path in said predetermined order and at a rate such that the series moves through the path within the period of persistence of vision;

e. a projection screen disposed in said optical path and adapted to move along the optical path nearer to and farther from said series of photographs, said projection screen having its surface formed with a curved cross-section and rotatable about an axis displaced from the center of curvature of the cross-section, which axis is disposed substantially at right angles to the optical path;

f. stroboscopic means for flashing said illuminating when a photograph is aligned with said path, whereby said photographs are projected onto said screen to create said three-dimensional image of said object;

wherein the improvement comprises:

g. a tinted transparent shield through which the projection screen may be viewed;

h. said screen being tinted so that the tints on the shield and the screen cooperate to conceal all parts of the screen except the illuminated image projected on the screen, thereby providing increased contrast between the image and the background.

15. Apparatus for forming and displaying a three-dimensional image of a selected portion of a three-dimensional object, comprising:

a. a film strip including a series of two-dimensional photographs of successive sections of said object, said photographs being arranged in a predetermined order corresponding to the relationship that said successive sections bear to each other, and a series of evenly spaced sprocket holes along one margin of the film strip;

b. an optical system defining an optical path;

c. means to move said photographs cyclically through said optical path in said predetermined order and at a rate such that the strip moves through the path within the period of persistence of vision;

d. a projection screen disposed in said optical path and adapted to move along the optical path toward and away from the photographs moving through the path, said projection screen having its surface formed with a curved cross-section and being rotatable about an axis displaced from the center of curvature of the cross-section, which axis is disposed substantially at righ angles to the optical path;

e. intermittently operable illuminating means;

wherein the improvement comprises:

f. an aperture in said margin of the film strip between two of said holes adjacent one end of the strip;

g. photoelectric means for controlling said illuminating means including two lamps spaced apart along one side of the path of the strip at a distance such that one lamp is aligned with the aperture when the other is aligned with a sprocket hole; and h. two photoelectric sensors aligned with said lamps and on the opposite side of the path from the lamps;

i. counting means responsive to one only of said photoelectric sensors to count the moving photographs and to flash said illuminating means when a photograph is aligned with said path; and j. means responsive to the simultaneous illumination of both said photoelectric sensors to reset the counting means.

16. Apparatus as in claim 15, including means effective when both said sensors are illuminated to cut off said illuminating means.

17. Apparatus as in claim 15, in which:

a. said counting means includes means including a blocking counter to keep said illuminating means from illuminating the photographs at the beginning of the strip; and b. presettable means for cutting off said blocking counter at a predetermined count.

18. Apparatus as in claim 17, including:

a. presettable means for establishing a selected count; and b. counting means including said presettable means to maintain said illuminating means in operation from the beginning of said strip until said predetermined count is reached.

19. Apparatus as in claim 15, in which said counting means includes:

a. first presettable means for establishing a predetermined count;

b. first counting means for blocking the operation of the illuminating means until said first predetermined count is reached;

c. second presettable means for setting a second predetermined count; and d. second counting means responsive to said second presettable means to maintain said illuminating means in operation for each photograph until said second predetermined count is reached.

20. Apparatus for forming and displaying a three-dimensional image of a three-dimensional object, comprising:

a. a series of two-dimensional photographs of successive sections of said object, said photographs being arranged in a predetermined order corresponding to the relationship that said successive sections bear to each other;

b. illuminating means;

c. an optical system defining an optical path extending from said illuminating means;

d. means to move said photographs through said optical path in said predetermined order and at a rate such that the series moves through the path within the period of persistence of vision;

e. a projection screen disposed in said optical path and adapted to move along the optical path nearer to and farther from the photographs moving through the path, said projection screen having its surface formed with a curved cross-section and rotatable about an axis displaced from the center of curvature of the cross-section, which axis is disposed substantially at right angles to the optical path;

f. stroboscopic means for flashing said illuminating means when a photograph is aligned with said path, whereby said photographs are projected onto said screen to create said three-dimensional image of said object;

g. an optical mask intersecting said optical path and having zones of different light transmittance;

h. support means for the mask, comprising:
  1. a fixed support;
  2. a hub rotatable in said fixed support about the optical path as an axis;
  3. a first disc fixed on the hub for rotation therewith;
  4. a second disc annular in form and rotatable about said optical path;
  5. said hub having a diametrical aperture therein intersecting said optical path, said mask being slidably mounted in the aperture for movement transversely of said path;

wherein the improvement comprises:
  6. a cam on the second disc;
  7. a follower connected to the mask and engaging the cam;
  8. means biasing the follower into engagement with the cam;
  9. rotation of the first disc and hub on the fixed support being effective to rotate the mask with respect to the optical path; and
  10. rotation of the second disc about the optical path being effective to move the mask transversely of the optical path so that said zones of different light transmittance are selectively disposed in said optical path.

* * * * *

UNITED STATES PATENT AND TRADEMARK OFFICE
CERTIFICATE OF CORRECTION

PATENT NO. : 4,294,523
DATED : October 13, 1981
INVENTOR(S) : Edward A. Woloshuk, et al.

It is certified that error appears in the above-identified patent and that said Letters Patent are hereby corrected as shown below:

In the Abstract, line 15, at the end of the line, "imgage" should read -- image --.

Col. 4, line 7, at the end of the line, "spiral" should read -- arcuate --.

Col. 6, line 27, "in the photosensor" should be deleted;

line 28, "block 48" should be deleted;

line 55, "enclosure" should be deleted;

line 58, after "located" insert -- in the photosensor block 48 --

Signed and Sealed this

Eighteenth Day of May 1982

[SEAL]

Attest:

GERALD J. MOSSINGHOFF

Attesting Officer    Commissioner of Patents and Trademarks